United States Patent
Shimakawa et al.

(10) Patent No.: US 11,088,504 B2
(45) Date of Patent: Aug. 10, 2021

(54) OPTICAL FIBER AMPLIFIER

(71) Applicant: SUMITOMO ELECTRIC INDUSTRIES, LTD., Osaka (JP)

(72) Inventors: Osamu Shimakawa, Osaka (JP); Hidehisa Tazawa, Osaka (JP); Takafumi Ohtsuka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 247 days.

(21) Appl. No.: 16/436,960

(22) Filed: Jun. 11, 2019

(65) Prior Publication Data

US 2019/0379174 A1 Dec. 12, 2019

(30) Foreign Application Priority Data

Jun. 12, 2018 (JP) .............................. JP2018-111968

(51) Int. Cl.
*H01S 3/067* (2006.01)
*G02B 6/036* (2006.01)
*G02B 6/35* (2006.01)

(52) U.S. Cl.
CPC ...... *H01S 3/06708* (2013.01); *G02B 6/03633* (2013.01); *G02B 6/3526* (2013.01)

(58) Field of Classification Search
CPC .................................................. H01S 3/06708
See application file for complete search history.

(56) References Cited

U.S. PATENT DOCUMENTS

| 2013/0114130 A1* | 5/2013 | Stampoulidis | H01S 3/06737 359/341.32 |
| 2014/0168756 A1* | 6/2014 | Zhu | G02B 6/02042 359/341.5 |
| 2019/0115715 A1* | 4/2019 | Hasegawa | H01S 3/06737 |
| 2019/0379175 A1* | 12/2019 | Shimakawa | H01S 3/06737 |

FOREIGN PATENT DOCUMENTS

JP 2004-120002 A 4/2004

* cited by examiner

*Primary Examiner* — Charlie Y Peng
(74) *Attorney, Agent, or Firm* — Faegre Drinker Biddle & Reath LLP

(57) ABSTRACT

An optical fiber amplifier comprising first, second and third optical fibers, and first, second and third lenses, is disclosed. First cores of the first optical fiber and second cores of the second optical fiber have homothetic arrangement each other in the arrangement of outer cores. The first core has a mode field diameter MFD1S when transmitting an optical signal and a core pitch P1, and the first lens has a focal distance f1S at the wavelength of the optical signal. The second core has a mode field diameter MFD2S when transmitting the optical signal and a core pitch P2, and the second lens has a focal distance f2S at the wavelength. The MFD1S of each first core is within ±25% of MFD2S×(P1/P2) of the corresponding second core, and the MFD1S of each first core is within ±25% of MFD2S×(f1S/f2S) of the corresponding second core.

14 Claims, 12 Drawing Sheets

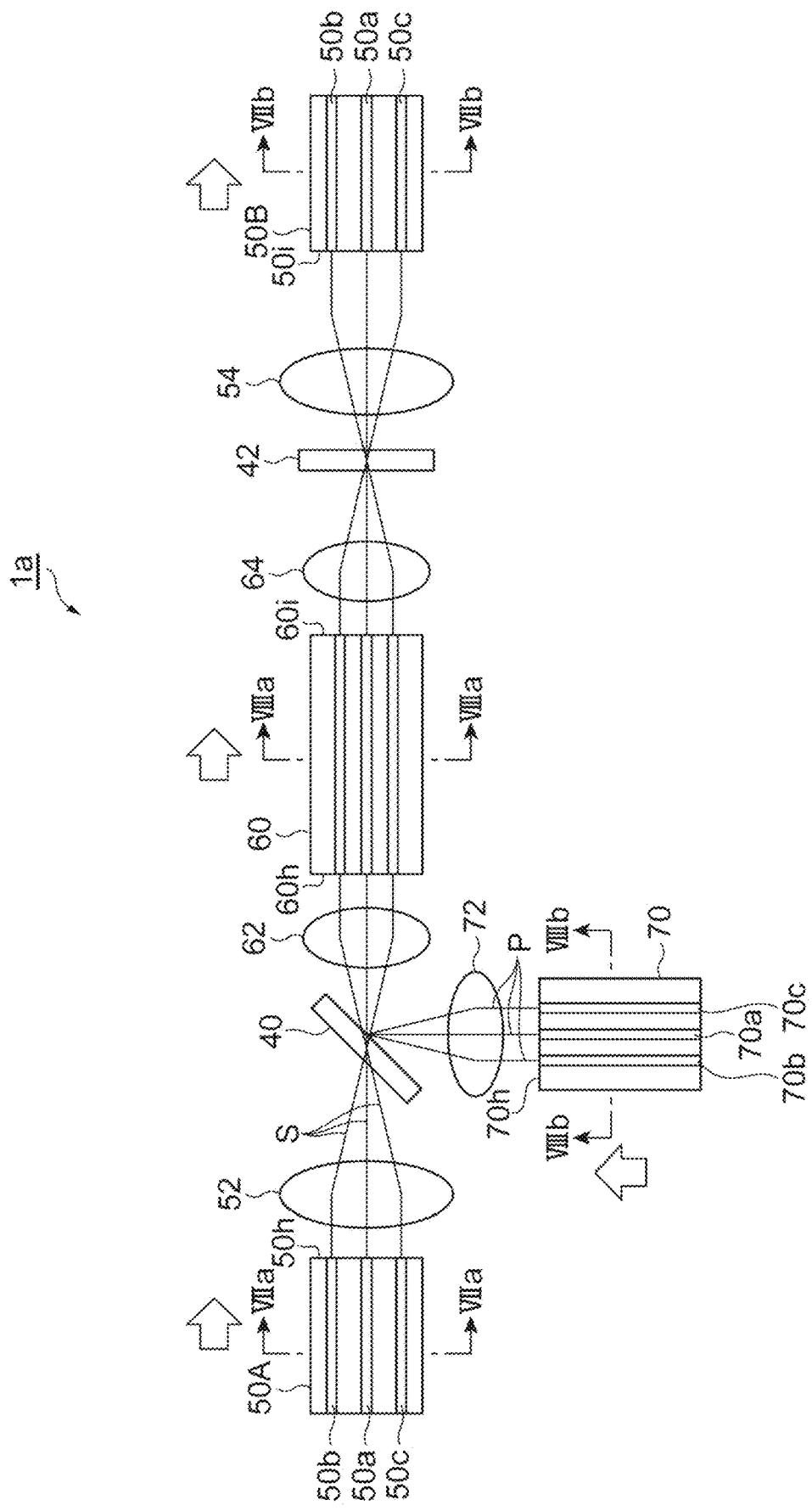

OPTICAL FIBER AMPLIFIER

CROSS REFERENCE

The present application is based upon and claims the benefit of the priority from Japanese patent application No. 2018-111968, filed on Jun. 12, 2018, which is hereby incorporated by reference in its entirety.

TECHNICAL FIELD

The present disclosure relates to an optical fiber amplifier.

BACKGROUND

JP2004-120002 discloses one example of an optical amplifier which reduces a connection loss at a connection portion of a rare-earth-doped fiber and a fiber type coupler due to a difference between mode field diameters (MFDs) of optical signal wavelength and excitation light wavelength. In the optical amplifier, a heat diffusion dopant is doped to the cores of two optical fibers such that the MFDs of the two fibers are matched with each other at both the optical signal wavelength and the excitation light wavelength, and the core diameters are expanded through the diffusion of the dopant at the connection portion, thereby matching the MFDs of the two optical fibers with each other.

SUMMARY

The present disclosure provides an optical fiber amplifier. The optical fiber amplifier comprises a first optical fiber, a first lens, a second optical fiber, a pair of second lenses, a third optical fiber, a third lens, a first optical member, and a second optical member. The first optical fiber has a plurality of first cores and a cladding surrounding the plurality of first cores. The first optical fiber is configured to transmit at least one optical signal. The first lens is arranged to face an outputting surface of the first optical fiber. The second optical fiber has a plurality of second cores and a cladding surrounding the plurality of second cores. A rare-earth element is doped to the second optical fiber. The second optical fiber is configured to amplify the optical signal propagating therein by excitation light. The pair of second lenses are respectively arranged to face entering and outputting surfaces of the second optical fiber. The third optical fiber has one third core or a plurality of third cores and a cladding surrounding the one or the plurality of third cores. The third optical fiber is configured to transmit the excitation light used for the signal amplification in the second optical fiber. The third lens is arranged to face an outputting surface of the third optical fiber. The first optical member is arranged in an optical path between the first optical fiber and the second optical fiber. The first optical member is configured to cause the optical signal output from the first optical fiber to enter the second optical fiber through transmission or reflection. The second optical member is arranged in an optical path between the third optical fiber and the second optical fiber. The second optical member is configured to cause the excitation light output from the third optical fiber to enter the second optical fiber through reflection or transmission. The first optical fiber, the first lens, the first optical member, one of the second lenses, and the second optical fiber are arranged such that the optical signal output from the first optical fiber enters the second optical fiber via the first lens, the first optical member, and the one of the second lenses. The third optical fiber, the third lens, the second optical member, the one or the other of the second lenses, and the second optical fiber are arranged such that the excitation light output from the third optical fiber enters the second optical fiber via the third lens, the second optical member, and the one or the other of the second lenses. The first cores of the first optical fiber and the second cores of the second optical fiber have homothetic arrangement each other at least in the arrangement of outer cores surrounding center of each fiber. The first cores of the first optical fiber each have a mode field diameter MFD1S when transmitting the optical signal and a core pitch P1, and the first lens has a focal distance f1S at the wavelength of the optical signal. The second cores of the second optical fiber each have a mode field diameter MFD2S when transmitting the optical signal and a core pitch P2, and the second lens has a focal distance f2S at the wavelength of the optical signal. The MFD1S of each first core of the first optical fiber is a value that is within ±25% of MFD2S×(P1/P2) of the corresponding second core of the second optical fiber, and the MFD1S of each first core of the first optical fiber is a value that is within ±25% of MFD2S×(f1S/f2S) of the corresponding second core of the second optical fiber.

BRIEF DESCRIPTION OF THE DRAWINGS

The foregoing and other purposes, aspects and advantages will be better understood from the following detailed description of a preferred embodiment of the invention with reference to the drawings, in which:

FIG. 6 is a diagram schematically illustrating the structure of an optical fiber amplifier according to a second embodiment.

DETAILED DESCRIPTION

Figure 1:
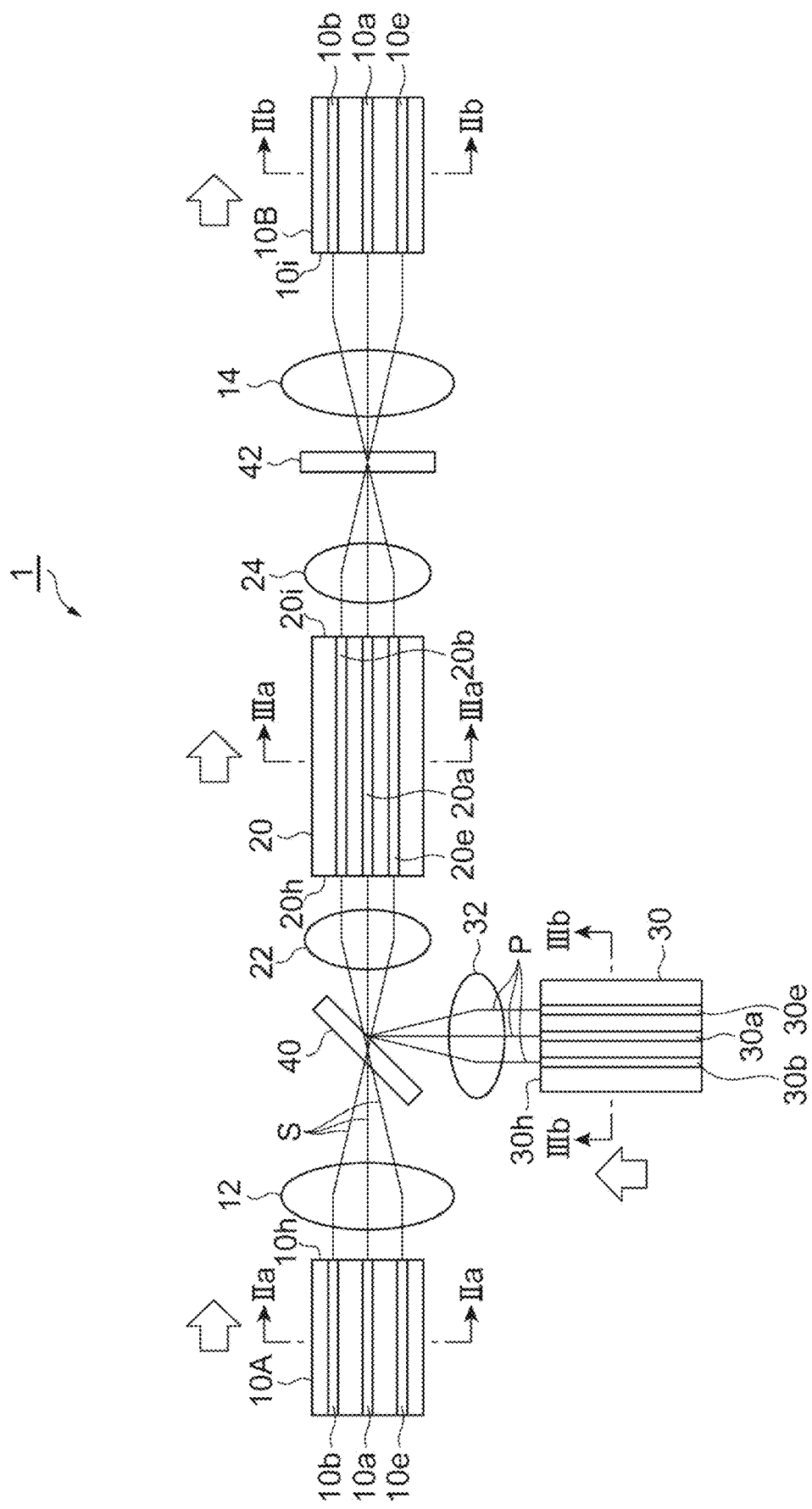
FIG. 1 is a diagram schematically illustrating the structure of an optical fiber amplifier according to a first embodiment.

Problem to be Solved by the Present Disclosure

The TEC processing, which is core diameter expansion processing through heating, according to JP2004-120002 is mainly used in a single core fiber in which there is only one core in a center axis of a fiber. It is difficult to apply the structure of this optical amplifier as it is to optical amplification in a multi-core fiber (MCF) having a central core and outer cores around it. If an attempt is made to apply the TEC processing to an MCF, it is necessary to diffuse the dopant uniformly to all the cores. Since the MCF has cores other than the central core, it is difficult to diffuse the dopant uniformly. In view of this, there is a demand for an optical fiber amplifier capable of mitigating connection loss even if applied to an MCF.

Effect of the Present Disclosure

According to the present disclosure, it is possible to provide an optical fiber amplifier capable of mitigating connection loss even when applied to an MCF.

Description of an Embodiment of the Present Disclosure

Embodiments of the present disclosure will be described. An optical fiber amplifier according to one embodiment of the disclosure comprises a first optical fiber, a first lens, a second optical fiber, a pair of second lenses, a third optical fiber, a third lens, a first optical member, and a second optical member. The first optical fiber has a plurality of first cores and a cladding surrounding the plurality of first cores. The first optical fiber is configured to transmit at least one optical signal. The first lens is arranged to face an outputting surface of the first optical fiber. The second optical fiber has a plurality of second cores and a cladding surrounding the plurality of second cores. A rare-earth element is doped to the second optical fiber. The second optical fiber is configured to amplify the optical signal propagating therein by excitation light. The pair of second lenses are respectively arranged to face entering and outputting surfaces of the second optical fiber. The third optical fiber has one third core or a plurality of third cores and a cladding surrounding the one or the plurality of third cores. The third optical fiber is configured to transmit the excitation light used for the signal amplification in the second optical fiber. The third lens is arranged to face an outputting surface of the third optical fiber. The first optical member is arranged in an optical path between the first optical fiber and the second optical fiber. The first optical member is configured to cause the optical signal output from the first optical fiber to enter the second optical fiber through transmission or reflection. The second optical member is arranged in an optical path between the third optical fiber and the second optical fiber. The second optical member is configured to cause the excitation light output from the third optical fiber to enter the second optical fiber through reflection or transmission. The first optical fiber, the first lens, the first optical member, one of the second lenses, and the second optical fiber are arranged such that the optical signal output from the first optical fiber enters the second optical fiber via the first lens, the first optical member, and the one of the second lenses. The third optical fiber, the third lens, the second optical member, the one or the other of the second lenses, and the second optical fiber are arranged such that the excitation light output from the third optical fiber enters the second optical fiber via the third lens, the second optical member, and the one or the other of the second lenses. The first cores of the first optical fiber and the second cores of the second optical fiber have homothetic arrangement each other at least in the arrangement of outer cores surrounding center of each fiber. The first cores of the first optical fiber each have a mode field diameter MFD1S when transmitting the optical signal and a core pitch P1, and the first lens has a focal distance f1S at the wavelength of the optical signal. The second cores of the second optical fiber each have a mode field diameter MFD2S when transmitting the optical signal and a core pitch P2, and the second lens has a focal distance f2S at the wavelength of the optical signal. The MFD1S of each first core of the first optical fiber is a value that is within ±25% of MFD2S×(P1/P2) of the corresponding second core of the second optical fiber; and the MFD1S of each first core of the first optical fiber is a value that is within ±25% of MFD2S×(f1S/f2S) of the corresponding second core of the second optical fiber.

In the above optical fiber amplifier, the arrangement of the outer cores of the first optical fiber for optical signal and the arrangement of the outer cores of the second optical fiber for amplification are similar to each other, and the first optical fiber and the second optical fiber are optically connected at a predetermined magnification by a spatial optical system such as a lens. The MFD1S of each first core of the first optical fiber is a value that is within ±25% of MFD2S×(P1/P2) of the corresponding second core of the second optical fiber, and the MFD1S of each first core of the first optical fiber is a value that is within ±25% of MFD2S×(f1S/f2S) of the corresponding second core of the second optical fiber. In this structure, even when the first optical fiber through which an optical signal is transmitted is an MCF, optical connection is suitably effected between the cores of the first and second optical fibers, making it possible to mitigate connection loss at the time of optical amplification between the optical fibers. That is, in an optical amplifier for MCF, it is possible to enhance the optical connection efficiency even between optical fibers differing in MFD. Further, since the first and second optical fibers are connected by a spatial optical system, it is possible to collectively connect a plurality of cores, making it possible to achieve simplification in structure and operation. In the case where the core design is the same, the MFD1S of each core of the first optical fiber and the MFD2S of each core of the second optical fiber are common values in the fibers, whereas in the case where the core design is different, they are values different from each other in the fibers. Further, in the case where the core design is different, the MFD1S of each core of the first optical fiber and the MFD2S of each core of the second optical fiber may be respectively expressed as MFD1S (N) and MFD2S (N) (N is an integer of 1 or more and can be expressed as: N=1, 2, 3, . . . , N).

In an embodiment, the third optical fiber may have the plurality of third cores and a cladding surrounding the plurality of third cores. The third cores of the third optical fiber and the second cores of the second optical fiber may have homothetic arrangement each other at least in the arrangement of outer cores surrounding center of each fiber. The second cores of the second optical fiber each have a mode field diameter MFD2P when transmitting the excitation light, and the second lenses have a focal distance f2P when transmitting the excitation light. The third cores of the third optical fiber each have a mode field diameter MFD3P when transmitting the excitation light and a core pitch P3, and the third lens has a focal distance f3P when transmitting the excitation light. The MFD3P of each third core of the third optical fiber may be a value that is within ±25% of MFD2P×(P3/P2) of the corresponding second core of the second optical fiber, and the MFD3P of each third core of the third optical fiber may be a value that is within ±25% of MFD2P×(f3P/f2P) of the corresponding second core of the second optical fiber. In this structure, even when the third optical fiber transmitting the excitation light is an MCF, it is possible to suitably effect optical connection between the cores of the third and second optical fibers, making it possible to mitigate the connection loss when effecting optical amplification between the fibers. That is, in an optical amplifier for MCF, it is possible to enhance the optical connection efficiency between fibers differing in MFD. Further, since the third and second optical fibers are connected by a spatial optical system, it is possible to collectively connect a plurality of cores, making it possible to achieve simplification in structure and operation. In the case where the core design is the same, the MFD3P of each third core of the third optical fiber and the MFD2P of each second core of the second optical fiber are common values in the fibers, whereas in the case where the core design is different, they are values different from each other in the fibers. In the case where the core design is different, the MFD3P of each third core of the third optical fiber and the MFD2P of each second core of the second optical fiber may be respectively expressed as MFD3P(N) and MFD2P(N) (N is an integer of 1 or more, and can be expressed as: N=1, 2, 3, . . . , N).

In an embodiment, one of the plurality of second cores of the second optical fiber may be a central core arranged on the center axis of the second optical fiber, and one third core or one of the plurality of third cores of the third optical fiber may be a central core arranged on the center axis of the fiber. In this case, the second optical fiber may be configured such that the excitation light emitted from the central core of the third optical fiber and entering the central core of the second optical fiber is mode-connected with the outer second cores of the second optical fiber to distribute the excitation light. In this structure, it is easy to cause the excitation light to enter the second optical fiber from the third optical fiber. Further, it is possible to reduce the number of light-emitting devices for generating the excitation light (e.g., the laser diodes (LD)).

In an embodiment, one of the plurality of second cores of the second optical fiber may be a central core arranged on the center axis of the second optical fiber, and the third optical fiber may be a single core fiber having the one third core arranged on the center axis of the third optical fiber and a cladding surrounding the one third core. In this case, the second optical fiber may be configured such that the excitation light emitted from the single core of the third optical fiber and entering the central core of the second optical fiber is mode-connected with the outer second cores of the second optical fiber to distribute the excitation light. In this structure, it is easy to cause the excitation light to enter the second optical fiber from the third optical fiber. Further, it is possible to reduce the number of light-emitting devices for generating the excitation light (e.g., laser diodes (LD)).

In an embodiment, the first optical fiber may not have the central core arranged on the center axis of the first optical fiber, or may be configured not to pass the optical signal through the central core arranged on the center axis of the first optical fiber. In this case, the central core of the second optical fiber can be utilized as a dedicated core allowing passage of the excitation light.

In an embodiment, this optical fiber amplifier may further comprise a first ferrule having a cylindrical configuration and retaining a fiber end of the first optical fiber, a second ferrule having a cylindrical configuration and retaining a fiber end of the second optical fiber, and a third ferrule having a cylindrical configuration and retaining a fiber end of the third optical fiber. In this case, the first lens connected to a distal end of the first ferrule may be a GRIN lens, the second lens connected to a distal end of the second ferrule may be a GRIN lens, the third lens connected to a distal end of the third ferrule may be a GRIN lens. An outer diameter of the first ferrule may be equal to an outer diameter of the GRIN lens of the first lens, an outer diameter of the second ferrule may be equal to an outer diameter of the GRIN lens of the second lens, and an outer diameter of the third ferrule may be equal to an outer diameter of the GRIN lens of the third lens. In this structure, it is possible to easily perform alignment between each fiber and each lens. In another embodiment, the first lens may be a GRIN lens fusion-bonded to a fiber end of the first optical fiber, the second lens may be a GRIN lens fusion-bonded to a fiber end of the second optical fiber, and the third lens may be a GRIN lens fusion-bonded to a fiber end of the third optical fiber. In this embodiment, an outer diameter of the first optical fiber may be equal to an outer diameter of the GRIN lens of the first lens, an outer diameter of the second optical fiber may be equal to an outer diameter of the GRIN lens of the second lens, and an outer diameter of the third optical fiber may be equal to an outer diameter of the GRIN lens of the third lens.

In an embodiment, the first, second, and third optical fibers may be configured not to pass the optical signal or the excitation light through each central core arranged on the center axis of each optical fiber, or may be configured not to have the central cores. In this structure, there is no need to perform oblique polishing or the like on the lens end in order to prevent reflection of light, and it is possible to sufficiently reduce light reflection solely through reflection prevention by AR coating or the like.

In an embodiment, all of the first, second and third cores may be arranged within a diameter of 0.1 mm around the center axis of each optical fiber. In this structure, it is possible to reduce offset of the optical path generated at the time of transmission or the like of light through a filter etc., making it possible to decrease deterioration in light connection efficiency generated with offset of the optical path.

In an embodiment, the outer second cores of the second optical fiber may be arranged to be closer to the center axis than the outer first cores of the first optical fiber. The MFD of the second optical fiber for amplification is often made smaller than the MFD of the other fibers, and subject to the influence of axial deviation due to rotational angular deviation. Due to the above-mentioned arrangement closer to the center, however, it is possible to relatively diminish the axial deviation amount due to rotational angular deviation. As a result, it is possible to further reduce the connection loss at the second optical fiber.

In an embodiment, the first and second optical members may be formed by one wavelength division multiplexing (WDM) filter. In this case, by this one wavelength division multiplexing filter, the optical signal emitted from the first optical fiber enters the second optical fiber through transmission or reflection, and the excitation light emitted from the third optical fiber enters the second optical fiber through reflection or transmission, whereby it is possible to form a forward excitation fiber amplifier. The second optical member may be formed by one wavelength division multiplexing filter. In this case, it is possible to form a rearward excitation fiber amplifier.

Detailed Description of the Embodiments of the Present Disclosure

In the following, embodiments of an optical fiber amplifier according to the present disclosure will be described with reference to the drawings. In the description, the same components or components of the same function are designated by the same reference numerals, and a redundant description will be left out.

First Embodiment

Figure 2A:
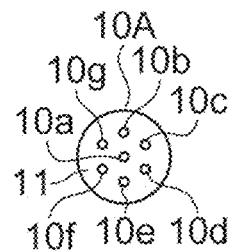
FIG. 2A is a cross-sectional view of an optical fiber shown 10A in FIG. 1 along the IIa-IIa line.
Figure 2B:
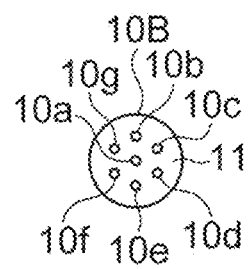
FIG. 2B is a cross-sectional view of an optical fiber 10B show in FIG. 1 along the IIb-IIb line.
Figure 3A:
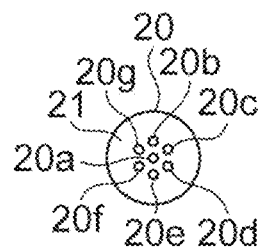
FIG. 3A is a cross-sectional view of an optical fiber 20 shown in FIG. 1 along the IIIa-IIIa line.
Figure 3B:
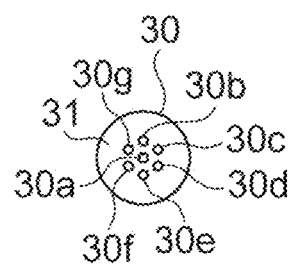
FIG. 3B is a cross-sectional view of an optical fiber 30 shown in FIG. 1 along the IIIb-IIIb line.

FIG. 1 is a diagram schematically illustrating the structure of an optical fiber amplifier according to the first embodiment. As shown in FIG. 1, an optical fiber amplifier 1 includes optical fibers 10A and 10B for signal transmission, collimating lenses 12 and 14, an optical fiber 20 for signal amplification, a pair of collimating lenses 22 and 24, an optical fiber 30 for an excitation light, a collimating lens 32, a wavelength division multiplexing (WDM) filter 40, and a gain equalizing filter 42. The optical fiber amplifier 1 is used in an optical communication system in which optical signals are transmitted through multi-core fibers (MCFs). The sectional configuration of each optical fiber is shown in FIGS. 2A and 2B, and FIGS. 3A and 3B. FIG. 2A is a cross-sectional view of an optical fiber 10A along the IIa-IIa line, and FIG. 2B is a cross-sectional view of an optical fiber 10B along the IIb-IIb line. FIG. 3A is a cross-sectional view of an optical fiber 20 along the IIIa-IIIa line, and FIG. 3B is a cross-sectional view of an optical fiber 30 along the IIIb-IIIB line.

The optical fibers 10A and 10B are fibers configured to transmit optical signals S for optical communication. Each of them has a central core 10a, outer cores 10b to 10g arranged so as to surround the central core 10a, and a cladding 11 surrounding the cores 10a to 10g. In the optical fibers 10A and 10B, the refractive index of the cores 10a to 10g is higher than the refractive index of the cladding 11, whereby the optical signals S are transmitted through the cores 10a to 10g. In the optical fibers 10A and 10B, the cores 10a to 10g are of the same design, and the cores 10a to 10g have a common mode field diameter MFD1S when the optical signals S are transmitted therethrough. Further, the cores 10a to 10g are arranged such that the core pitches P1, i.e., the inter-center distances, are equal to each other. That is, in the outer cores 10b to 10g, the inter-center distances between the adjacent cores are all P1, and, in the central core 10a, the inter-center distances between the central core 10a and the outer cores 10b to 10g are all P1. In the following, the word "equalizing" is used in a similar sense for the core pitches. The optical fibers 10A and 10B may not have the central core 10a or a part of the outer cores 10b to 10g as long as each of the optical fibers 10A and 10B has two or more cores. The optical fibers 10A and 10B may be configured not to pass the optical signal S through the central core 10a. In this case, the core pitch P1 means the core pitch of the outer cores 10b through 10g. The optical signal S transmitted through the optical fibers 10A and 10B is a beam, for example, of a wavelength band of 1.55 μm.

The collimating lens 12 is arranged to face an outputting surface 10h of the optical fiber 10A on the incident side of the optical signals S before amplification, and condenses the beams entering from the optical fiber 10A toward the WDM filter 40. The collimating lens 12 has a focal distance f1S when transmitting the optical signal S. The collimating lens 14 is arranged to face an incident surface 10i of the optical fiber 10B on the outputting side of the optical signals S after the amplification, and collimates the optical signals S amplified by the optical fiber 20 and made gain-equalizing by the filter 42 toward the optical fiber 10B. The collimating lens 14 may have the same focal distance f1S as the collimating lens 12.

In the optical fiber 20, a rare earth element such as erbium is doped to the cores 20a to 20g, and when the optical signals S from the optical fiber 10A are transmitted through it, the optical fiber 20 amplifies the optical signals S by excitation light P from the optical fiber 30. The optical fiber 20 has a central core 20a, outer cores 20b to 20g arranged so as to surround the central core 20a, and a cladding 21 surrounding the cores 20a to 20g. In the optical fiber 20, the refractive index of the cores 20a to 20g is higher than the refractive index of the cladding 21, whereby the optical signals S and the excitation light P are transmitted through the cores 20a to 20g. In the optical fiber 20, the cores 20a to 20g are of the same design, and the cores 20a to 20g have a common mode field diameter MFD2S when the optical signals S are transmitted through them, and a common mode field diameter MFD2P when the excitation light P is transmitted through them. The cores 20a to 20g are arranged such that the core pitch P2 which is the inter-center distance thereof is uniform. The excitation light entering the optical fiber 20 may be a beam of a wavelength band of, for example, 0.98 μm or a beam of a wavelength band of, for example, 1.48 μm.

In the optical fiber 20, the arrangement of the cores 20a to 20g is similar to the arrangement of the cores 10a to 10g of the optical fibers 10A, 10B. That is, the central core 20a is arranged on the center axis of the optical fiber 20 so as to correspond to the central core 10a, and the outer cores 20b to 20g are arranged at the same arrangement angle as that of the outer cores 10b to 10g so that they may respectively correspond to the outer cores 10b through 10g. For example, the outer cores 10b to 10g and the outer cores 20b to 20g are arranged such that the angles at which the two adjacent cores and the center axis are connected to each other are equivalent to each other. On the other hand, between the optical fibers 10A and 10B and the optical fiber 20, the core pitch P1 of each of the optical fibers 10A and 10B and the core pitch P2 of the optical fiber 20 differ from each other. For example, the core pitch P2 is smaller than the core pitch P1. The optical fiber 20 may not have the central core 20a or a part of the outer cores 20b to 20g as long as the optical fiber 20 has two or more cores. The number of cores of the optical fiber 20 is not limited to the above-mentioned one but may be some other number. It is desirable for the number of cores to be in correspondence with the cores 10a to 10g (or 10b to 10g) of the optical fiber 10A, 10B.

The collimating lens 22 is arranged to face the entering surface 20h of the optical fiber 20, and collimates the optical signals S output from the optical fiber 10A and condensed at the WDM filter 40 toward the optical fiber 20. The collimating lens 24 is arranged to face the outputting surface 20i of the optical fiber 20, and condenses the beam amplified and output by the optical fiber 20 toward the filter 42. Each of the collimating lenses 22 and 24 has a focal distance f2S when transmitting the optical signals S, and a focal distance f2P when transmitting the excitation light P.

The optical fiber 30 is configured to transmit the excitation light P used for signal amplification at the optical fiber 20. The optical fiber 30 has a central core 30a, outer cores 30b to 30g arranged so as to surround the central core 30a, and a cladding 31 surrounding the cores 30a to 30g. In the optical fiber 30, the refractive index of the cores 30a to 30g is higher than the refractive index of the cladding 31, whereby the excitation light P is transmitted through the cores 30a to 30g. In the optical fiber 30, the cores 30a to 30g are prepared by the same design, and the cores 30a to 30g have a common mode field diameter MFD3P when the excitation light P is transmitted through them. Further, the cores 30a to 30g are arranged such that their core pitch P3, which is the inter-center distance thereof, is uniform. The excitation light P transmitted through the optical fiber 30 is caused to enter the cores 30a to 30g of the optical fiber 30 from a light-emitting device (not shown), e.g., a laser diode (LD).

Figure 11:
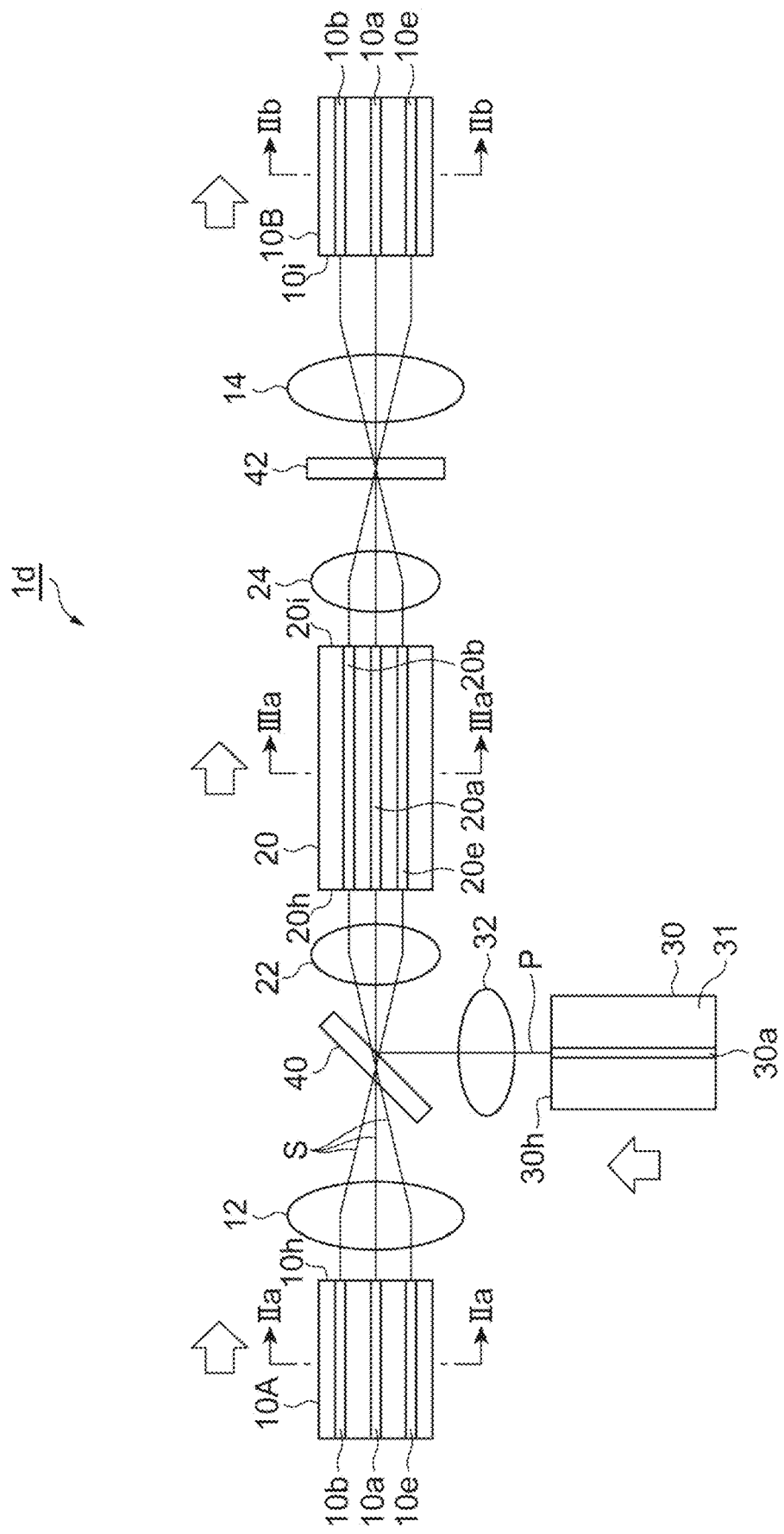
FIG. 11 is a schematic view of the structure of an optical fiber amplifier according to another modification.

In the optical fiber 30, the arrangement of the cores 30a to 30g is similar to the arrangement of the cores 20a to 20g of the optical fiber 20. That is, the central core 30a is arranged on the center axis of the optical fiber 30 so as to correspond to the central core 20a, and the outer cores 30b to 30g are arranged at the same angle as the arrangement angle of the outer cores 20b to 20g so that they correspond to the outer cores 20b to 20g, respectively. In an example, the outer cores 20b to 20g and the outer cores 30b to 30g are arranged such that the angles at which the two adjacent cores and the center axis are connected to each other are equivalent to each other. On the other hand, between the optical fiber 30 and the optical fiber 20, the core pitch P3 of the optical fiber 30 and the core pitch P2 of the optical fiber 20 differ from each other. For example, the core pitch P2 is smaller than the core pitch P3. In this way, the arrangement of the cores 20a to 20g of the optical fiber 20 is similar to both the arrangement of the cores 10a to 10g of the optical fibers 10A and 10B and the arrangement of the cores 30a to 30g of the optical fiber 30. The optical fiber 30 may not have the central core 30a. Further, the number of cores of the optical fiber 30 is not limited to the above-mentioned one but may be some other number. The optical fiber 30 may be configured to be equipped solely with the central core 30a and the cladding surrounding the same, that is, it may be a single core fiber, as shown in FIG. 11. In the case where the optical fiber 30 is a single core fiber, the excitation light P from the optical fiber 30 is caused to enter solely the central core 20a of the optical fiber 20, and is mode-connected with the outer cores 20b to 20g at the optical fiber 20 to be used for amplification.

The collimating lens 32 is arranged to face the outputting surface 30h of the optical fiber 30, and condenses the excitation light P entering from the optical fiber 30 toward the WDM filter 40. The collimating lens 32 has a focal distance f3P when transmitting the excitation light P.

The WDM filter 40 is arranged in the optical path of the optical fiber 10A and the optical fiber 20, and causes the optical signals S emitted from the optical fiber 10A to enter the optical fiber 20 through transmission. The WDM filter 40 does not transmit a beam of a wavelength other than that of the optical signals S when transmitting the optical signals S therethrough. Further, the WDM filter 40 is arranged in the optical path of the optical fiber 30 and the optical fiber 20, and causes the excitation light P emitted from the optical fiber 30 to enter the optical fiber 20 through reflection. The WDM filter 40 may be a filter which causes the optical signals S emitted from the optical fiber 10A to enter the optical fiber 20 through reflection, and which causes the excitation light P emitted from the optical fiber 30 to enter the optical fiber 20 through transmission.

The filter 42 is a gain equalizing filter arranged in the optical path of the optical fiber 20 and the optical fiber 10B. The filter 42 transmits the optical signals S amplified by the optical fiber 20, and reflects and returns the excitation light P, etc. used for the amplification at the optical fiber 20.

In the optical fiber amplifier 1, as a spatial optical system for the optical connection of the optical signals S, the optical fiber 10A, the collimating lens 12, the WDM filter 40, the collimating lens 22, and the optical fiber 20 are arranged such that the optical signals S output from the optical fiber 10A is condensed by the collimating lens 12, that only beams of the wavelength of the optical signals S are transmitted by the WDM filter 40, and that the transmitted optical signals S are collimated by the collimating lens 22 and enters the optical fiber 20. In addition, as another spatial optical system for the optical connection of the excitation light P, the optical fiber 30, the collimating lens 32, the WDM filter 40, the collimating lens 22, and the optical fiber 20 are arranged such that the excitation light P output from the optical fiber 30 is condensed by the collimating lens 32, that the excitation light P is reflected by the WDM filter 40, and that the reflected excitation light P is collimated by the collimating lens 22 and enters the optical fiber 20.

Figure 4:
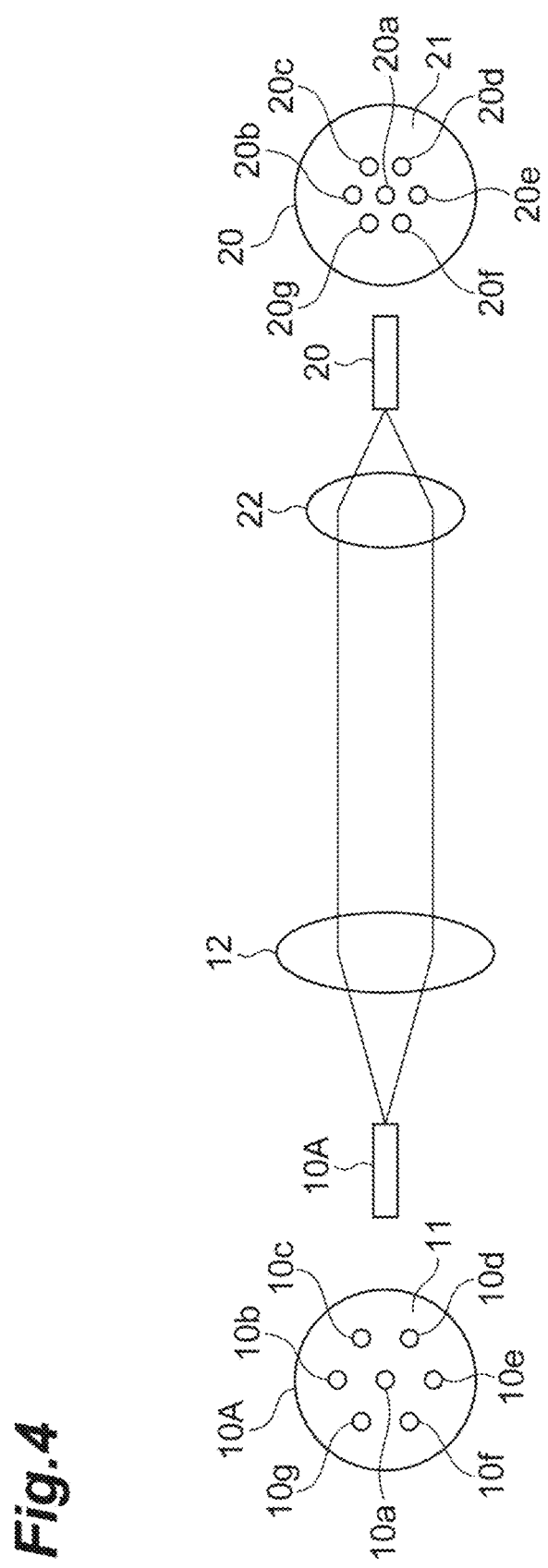
FIG. 4 is a schematic view for illustrating the basic principle of optical connection between a transmission fiber and an amplification fiber.

Here, the optical connection between the optical fiber 10A and the optical fiber 20, and the optical connection between the optical fiber 30 and the optical fiber 20 will be described in more detail with reference to FIG. 1 and FIG. 4. FIG. 4 is a schematic view for illustrating the basic principle of optical connection between the optical fiber 10A for transmission and the optical fiber 20 for amplification. In FIG. 4, the WDM filter 40 is omitted. As shown in FIG. 4, the optical fiber 10A from which a beam is emitted and the optical fiber 20 to which the beam enters are optically connected by a spatial optical system consisting, for example, of the two collimating lenses 12 and 22. In the example shown in FIG. 4, the core pitch P1 and the mode field diameter MFD1S of the optical fiber 10A are larger than the core pitch P2 and the mode field diameter MFD2S of the optical fiber 20, and the focal distance f1S of the collimating lens 12 at the optical signal S is larger than the focal distance f2S of the collimating lens 22 at the optical signal S. That is, while similar to each other in arrangement, the cores 10a to 10g of the optical fiber 10A and the cores 20a to 20g of the optical fiber 20 differ from each other in core pitch and mode field diameter. Thus, for the optical fiber 10A and the optical fiber 20 to be ideally connected (without involving any connection loss), it is necessary that the following equations (1) and (2) should be satisfied:

$$\text{Lens magnification } M12 = f2S/f1S \qquad (1)$$

$$\text{Lens magnification } M12 = P2/P1 = MFD2S/MFD1S \qquad (2)$$

Here, M12 means the lens magnification of the collimating lenses 12 and 22. f1S indicates the focal distance of the collimating lens 12 at the wavelength of the optical signal S, and f2S indicates the focal distance of the collimating lens 22 at the wavelength of the optical signal S. P1 is the core pitch of the optical fiber 10, and MFD1S is the mode field diameter of the cores of the optical fibers 10A and 10B at the wavelength of the optical signal S. P2 is the core pitch of the optical fiber 20, and MFD2S is the mode field diameter of the cores of the optical fiber 20 at the wavelength of the optical signal S.

Similarly, also regarding the optical connection of the optical fiber 30 and the optical fiber 20, while their arrangements are similar to each other, the cores 30a to 30g of the optical fiber 30 and the cores 20a to 20g of the optical fiber 20 differ from each other in core pitch and mod field diameter. Thus, to connect the optical fiber 30 and the optical fiber 20 ideally (without involving any connection loss), it is necessary that the following equations (3) and (4) should be satisfied:

Lens magnification $M32(p)=f2P/f3P$ (3)

Lens magnification $M32(p)=P2/P3=MFD2P/MFD3P$ (4)

Here, M32 is the lens magnification attained by the collimating lenses 32 and 22. f2P is the focal distance of the collimating lens 22 at the wavelength of the excitation light P, and f3P is the focal distance of the collimating lens 32 at the wavelength of the excitation light P. MFD2P is the mode field diameter of the cores of the optical fiber 20 at the wavelength of the excitation light P. P3 is the core pitch of the optical fiber 30, and MFD3P is the mode field diameter of the cores of the optical fiber 30 at the wavelength of the excitation light P.

Ideally, it is desirable for the optical connection of the optical fiber 10A, the optical fiber 30, and the optical fiber 20 by the spatial optical system to satisfy all of the above equations (1), (2), (3), and (4). In the present embodiment, however, in addition to what satisfy the above-mentioned relationships, there are also included optical connections in which the deviation from the ideal values of MFD1S of the optical fibers 10A and 10B and of MFD3P of the optical fiber 30 with respect to MFD2S and MFD2P of the optical fiber 20 is ±25% or less. More preferably, there are included optical connections in which the deviation from MFD1S of the optical fibers 10A and 10B and MFD3P of the optical fiber 30 with respect to MFD2S and MFD2P of the optical fiber 20 is ±20% or less. This is due to the fact that, in a deviation within these ranges, the connection loss when the optical fibers which are MCFs are connected is within a permissible range.

More specifically, the optical fiber amplifier 1 is formed to satisfy the following conditions (1) through (4):
[Optical Connection Between the Optical Fiber 10A and the Optical Fiber 20]

Condition (1): Each of the MFD1S of the cores 10a to 10g of the optical fiber 10A at the optical signal S is a value which is within ±25% of MFD2S×(P1/P2) of the corresponding cores 20a to 20g of the optical fiber 20 at the optical signal S.

Condition (2): Each of the MFD1S of the cores 10a to 10g of the optical fiber 10A at the optical signal S is a value which is within ±25% of MFD2S×(f1S/f2S) of the corresponding cores 20a to 20g of the optical fiber 20 at the optical signal S.
[Optical Connection Between the Optical Fiber 30 and the Optical Fiber 20]

Condition (3): Each of the MFD3P of the cores 30a to 30g of the optical fiber 30 at the excitation light P is a value which is within ±25% of MFD2P×(P3/P2) of the corresponding cores 20a to 20g of the optical fiber 20 at the excitation light P.

Condition (4): Each of the MFD3P of the cores 30a to 30g of the optical fiber 30 at the excitation light P is a value which is within ±25% of MFD2P×(f3P/f2P) of the corresponding cores 20a to 20g of the optical fiber 20 at the excitation light P.

The optical connection between the optical fiber 20 and the optical fiber 10B is similar to that in the case of the optical connection between the optical fiber 10A and the optical fiber 20.

Next, an example of the optical fiber amplifier 1 will be described with reference to the following table 1. Table 1 summarizes the MFD, core pitch, and focal distance in the case where the optical signal S is of a wavelength band of 1.55 μm and where the excitation light P is of a wavelength band of 0.98 μm.

TABLE 1

|  | Optical Fiber 10 (transmission) | Optical Fiber 20 (amplification EDF) | Optical Fiber 30 (excitation) |
|---|---|---|---|
| MFD@1.55 μm | MFD1S = 10 μM | MFD2S = 6 μm | N/A |
| MFD@0.98 μm | N/A | MFD2P = 5.5 μm | MFD3P = 5.5 μm |
| Core pitch | 35 μm | 25 μm | 25 μm |
| Lensf@1.55 μm (focal distance[mm]) | f1S = 1.4 mm | f2S = 1 mm | f3S = 1 mm |
| Lensf@0.98 μm (focal distance[mm]) | f1P = 1.4 mm | f2P = 1 mm | f3P = 1 mm |

[Optical Connection Between the Optical Fiber 10A and the Optical Fiber 20]

In the case of the above example, in the optical connection between the optical fiber 10A and the optical fiber 20, due to the spatial optical system such as a lens, regarding condition (1), the MFD1S of the cores 10a to 10g is 10 μm, whereas the value within the range of ±25% of (MFD2S×(P1/P2)) is not less than 6.3 μm and not more than 10.5 μm, thus satisfying condition (1). Regarding condition (2), the MFD1S of the cores 10a to 10g is 10 μm, whereas the value within the range of ±25% of (MFD2S×(f1S/f2S)) is not less than 6.3 μm and not more than 10.5 μm, thus satisfying condition (2).
[Optical Connection Between the Optical Fiber 30 and the Optical Fiber 20]

In the case of the above example, in the optical connection between the optical fiber 30 and the optical fiber 20, due to the spatial optical system such as a lens, regarding condition (3), the MFD3P of the cores 30a to 30g is 5.5 μm, whereas the value within the range of ±25% of (MFD2P×(P3/P2)) is not less than 4.125 μm and not more than 6.875 μm, thus satisfying condition (3). Regarding condition (4), the MFD3P of the cores 30a to 30g is 5.5 μm, whereas the value within the range of ±25% of (MFD2P×(f3P/f2P)) is not less than 4.125 μm and not more than 6.875 μm, thus satisfying condition (4).

As described above, in the optical fiber amplifier 1 according to the present embodiment, the optical fibers 10A and 10B transmitting the optical signals S and the optical fiber 20 amplifying the optical signals S are optically connected by the spatial optical system such as the collimating lenses 12 and 22 and the WDM filter 40. Furthermore, the arrangement of the cores 10a to 10g of the optical fibers 10A and 10B and the arrangement of the cores 20a to 20g of the optical fiber 20 are similar to each other. Each of the MFD1S of the cores 10a to 10g of the optical fibers 10A and 10B is a value which is within ±25% of MFD2S×(P1/P2) of the corresponding cores 20a to 20g of the optical fiber 20, and is a value which is within ±25% of MFD2S×(f1S/f2S) of the corresponding cores 20a to 20g of the optical fiber 20. In this structure, even when the optical fibers 10A and 10B transmitting the optical signals S are MCF, it is possible to suitably effect optical connection between the cores of the optical fibers 10A, 10B and the optical fiber 20, making it possible to reduce the connection loss at the time of optical amplification between the optical fibers. That is, in an optical amplifier for MCF, it is possible to enhance the optical connection efficiency even between optical fibers differing from each other in MFD. Further, the optical fibers 10A, 10B and the optical fiber 20 are connected to each other by the spatial optical system, it is possible to collectively connect a plurality of cores, making it possible to achieve simplification in structure and operation.

In the optical fiber amplifier 1, the arrangement of the cores 30a to 30g of the optical fiber 30 and the arrangement of the cores 20a to 20g of the optical fiber 20 are similar to each other. Each of the MFD3P of the cores 30a to 30g of the optical fiber 30 is a value which is within ±25% of MFD2P×(P3/P2) of the corresponding cores 20a to 20g of the optical fiber 20, and is a value which is within ±25% of MFD2P×(f3P/f2P) of the corresponding cores 20a to 20g of the optical fiber 20. In this structure, even when the optical fibers 30 transmitting the excitation light P are MCF, it is possible to suitably effect optical connection between the cores of the optical fiber 20 and the cores of the optical fiber 30, making it possible to reduce the connection loss at the time of optical amplification between the optical fibers. That is, in an optical amplifier for MCF, it is possible to enhance the optical connection efficiency even between the optical fibers 20 and 30 differing from each other in MFD. Further, the optical fibers 20 and 30 are connected to each other by the spatial optical system, it is possible to collectively connect a plurality of cores, making it possible to achieve simplification in structure and operation.

Figure 5A:
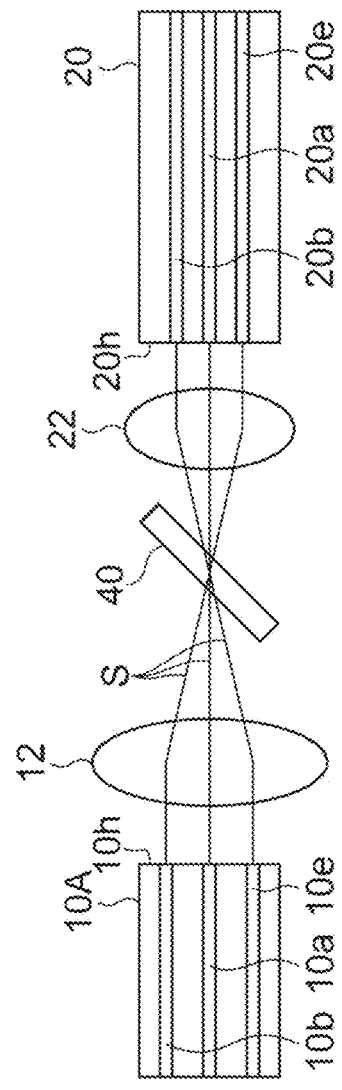
FIGS. 5A to 5D are diagrams for illustrating optical path offset generated at the time of optical connection between a transmission fiber and an amplification fiber.
Figure 5D:
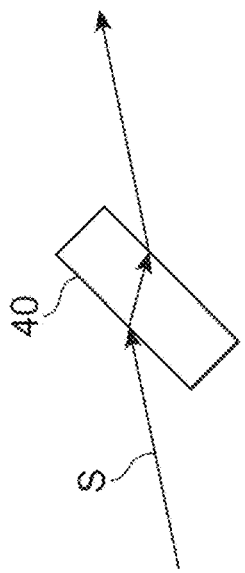
Figure 5C:
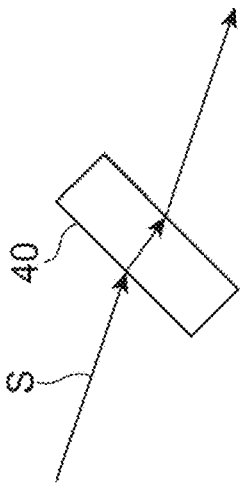
Figure 5B:
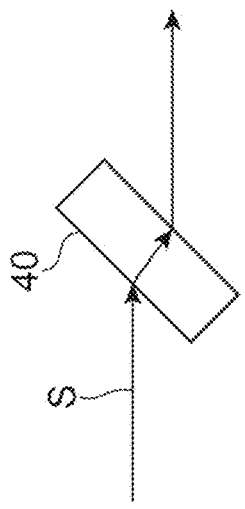

In the optical fiber amplifier 1, all of the cores 10a to 10g, 20a to 20g, and 30a to 30g of the optical fibers 10A, 10B, 20, and 30 may be arranged within a diameter of 0.1 mm around the center axis of each optical fiber. As shown in FIGS. 5A through 5D, when, for example, the optical signals S from the optical fiber 10A pass through the WDM filter 40, optical path offset is likely to be generated due to the difference in refractive index between air and filter. FIG. 5A shows an example of the optical connection between the optical fiber 10A and the optical fiber 20, FIG. 5B shows the transmission state of the optical signal S from the central core 10a through the WDM filter 40 (with little offset), and FIGS. 5C and 5D show the transmission state of the optical signals S from the outer cores 10b to 10g through the WDM filter 40 (with great offset). This deteriorates optical connection efficiency which would result when the offset in the optical path is large, such that axial deviation occurs when effecting the optical connection to the optical fiber 20. Preferably, the outer cores of the optical fibers 10A, 10B, 20, and 30 are all arranged within a diameter of 0.1 mm around the center axis of each optical fiber, whereby it is possible to reduce the offset of the optical path and to mitigate the influence thereof. In this structure, it is possible to reduce the offset of the optical path generated, for example, when a beam such as the optical signal S is transmitted through the WDM filter 40, whereby it is possible to decrease a reduction in optical connection efficiency generated as the optical path is offset. This also applies to the filter 42.

In the optical fiber amplifier 1, the outer cores 20b to 20g of the optical fiber 20 may be arranged closer to the center axis than the outer cores 10b to 10g of the optical fibers 10A and 10B. The MFD of the optical fiber 20 for amplification is often made smaller than the MFD of the other optical fibers, and is subject to the influence of axial deviation due to rotational angle deviation. By arranging it closer to the center as in the present structure, it is possible to relatively reduce the axial deviation amount due to the rotational angle deviation. As a result, it is possible to further reduce the connection loss at the optical fiber 20.

In a modification, in the optical fiber amplifier 1, the optical fiber 20 may be configured such that the excitation light P emitted from the central core 30a of the optical fiber 30 and entering the central core 20a of the optical fiber 20 is mode-connected with the outer cores 20b to 20g of the optical fiber 20 to distribute the excitation light P. In this structure, regarding the excitation light P, only optical connection between the central cores 30a and 20a is effected, so that it is easy to cause the excitation light P to enter the optical fiber 20 from the optical fiber 30. Further, it is possible to reduce the number of light-emitting devices for generating the excitation light P (e.g., laser diodes (LD), not shown).

As a modification, in the optical fiber amplifier 1d, the optical fiber 30 may be a single core fiber having the central core 30a arranged on the center axis of the optical fiber 30 and a cladding 31 surrounding the central core 30a, as shown in FIG. 11. In this case, the optical fiber 20 may be configured such that the excitation light P emitted from the central core 30a of the optical fiber 30 and entering the central core 20a of the optical fiber 20 is mode-connected with the outer cores 20b to 20g of the optical fiber 20 to distribute the excitation light. As in the above modification, in this structure, it is easy to cause the excitation light to enter the optical fiber 20 from the optical fiber 30. Further, it is possible to reduce the number of light-emitting devices for generating the excitation light P (e.g., laser diodes (LD)).

Figure 12:
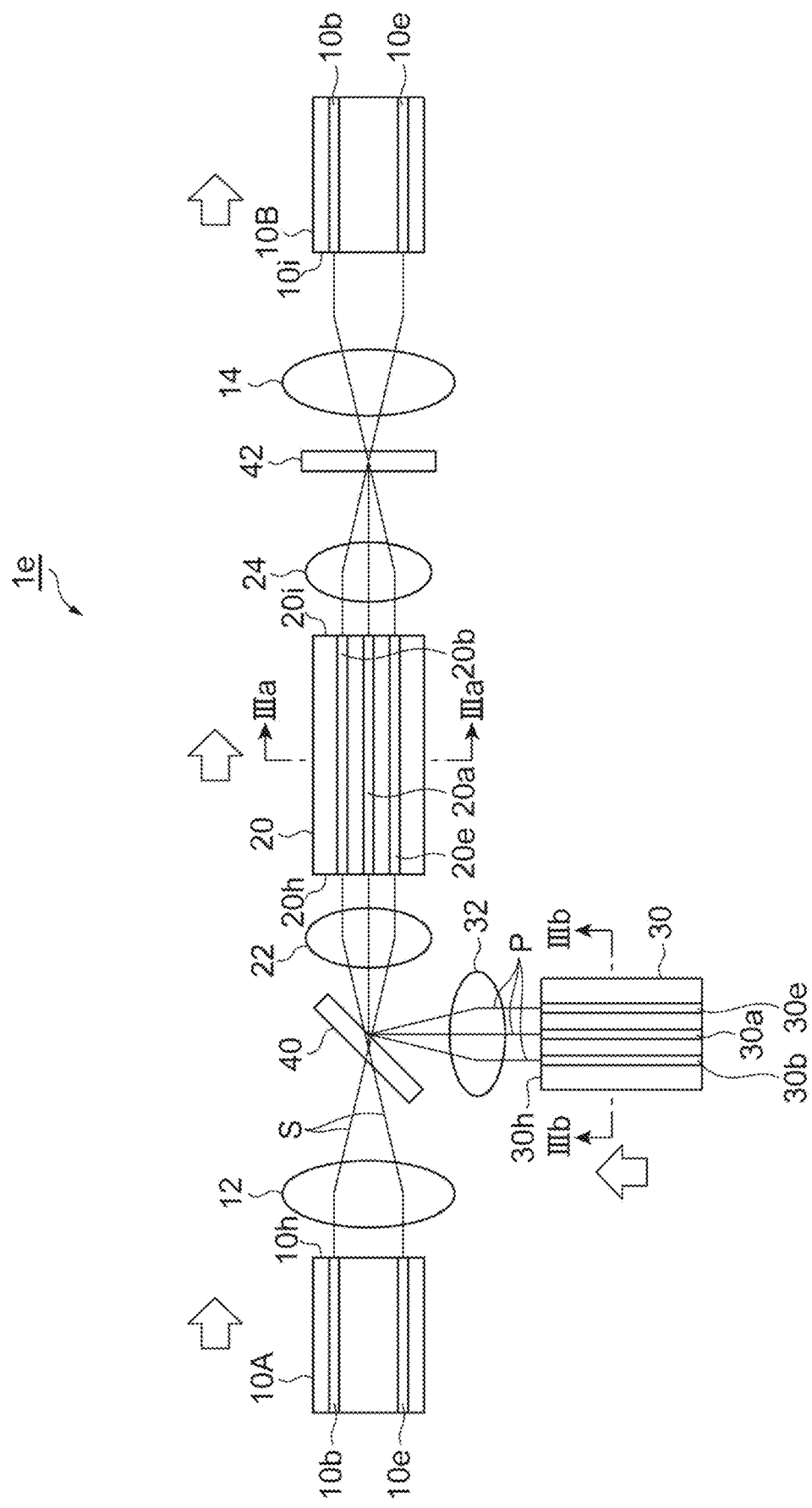
FIG. 12 is a schematic view of the structure of an optical fiber amplifier according to further another modification.

As a modification, in the optical fiber amplifier 1e, the central core 10a of the optical fiber 10A, 10B may not be arranged on the optical fiber, as shown in FIG. 12. Further, a structure may be adopted in which the optical signal S is not passed through the central core 10a arranged on the center axis of the optical fiber 10A, 10B. In this case, it is possible to utilize the central core 20a of the optical fiber 20 as a dedicated core allowing passage of the excitation light P.

As a modification, in the optical fiber amplifier 1, at least one or all the fibers of the optical fibers 10A, 10B, 20, and 30 may be configured not to pass the optical signal or the excitation light through the central core arranged on the center line of the fiber, or may be configured not to have the central core. In this structure, there is no need to perform oblique polishing or the like on the lens end in order to prevent reflection of light, and it is possible to sufficiently reduce light reflection solely through reflection prevention by an AR coating or the like.

In the optical fiber amplifier 1, the WDM filter 40 is commonly arranged on the optical path between the optical fiber 10A and the optical fiber 20 and on the optical path between the optical fiber 30 and the optical fiber 20, and has a function of causing the optical signals S emitted from the optical fibers 10A and 10B to enter the optical fiber 20 through transmission, and a function of causing the excitation light P emitted from the optical fiber 30 to enter the optical fiber 20 through reflection. Due to this arrangement/structure, it is possible to form a forward excitation type fiber amplifier.

Second Embodiment

Figure 7A:
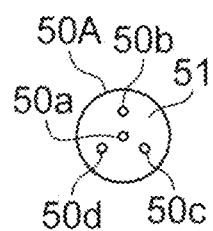
FIG. 7A is a cross-sectional view of an optical fiber 50A shown in FIG. 6 along the VIIa-VIIa line.
Figure 7B:
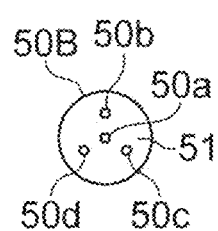
FIG. 7B is a cross-sectional view of an optical fiber 50B show in FIG. 6 along the VIIb-VIIb line.
Figure 8A:
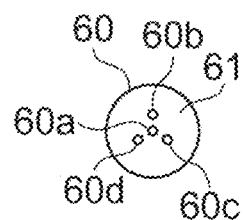
FIG. 8A is a cross-sectional view of an optical fiber 60 shown in FIG. 6 along the VIIIa-VIIIa line.
Figure 8B:
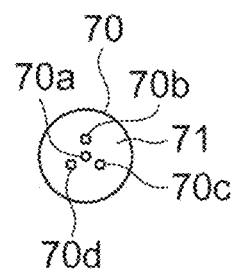
FIG. 8B is a cross-sectional view of an optical fiber 70 shown in FIG. 6 along the VIIIb-VIIIb line.

Next, an optical fiber amplifier 1a according to the second embodiment will be described with reference to FIG. 6, FIGS. 7A and 7B, and FIGS. 8A and 8B. FIG. 6 is a diagram schematically illustrating the structure of the optical fiber amplifier 1a according to the second embodiment. As shown in FIG. 4, substantially as in the case of the first embodiment, the optical fiber amplifier 1a includes optical fibers 50A and 50B for signal transmission, collimating lenses 52 and 54, an optical fiber 60 for signal amplification, a pair of collimating lenses 62 and 64, an optical fiber 70 for excitation light, a collimating lens 72, a WDM filter 40, and a gain equalizing filter 42. The sectional configuration of each optical fiber is shown in FIGS. 7A and 7B and FIGS. 8A and 8B. FIG. 7A is a cross-sectional view of the optical fiber 50A along the VIIa-VIIa line, and FIG. 7B is a cross-sectional view of the optical fiber 50B along the VIIb-VIIb line: FIG. 8A is a cross-sectional view of the optical fiber 60 along the VIII-VIII line, and FIG. 8B is a cross-sectional view of the optical fiber 70 along the VIIIb-VIIIb line. While the optical fiber amplifier 1a has substantially the same structure as that of the optical fiber amplifier 1 according to the first embodiment, the former differs from the latter in that the design of each core in the optical fibers 50A, 50B, 60, and 70 is not the same and that the mode field diameter of each core differs. The following description will center on the differences from the optical fiber amplifier 1, and a description of the same portions may be left out.

The optical fibers 50A and 50B are configured to transmit the optical signals S for optical communication, and have a central core 50a, outer cores 50b to 50d, and a cladding 51 surrounding the cores 50a to 50d. In the optical fiber 50A and 50B, the cores 50a to 50d are prepared through a different design, and the cores 50a to 50d have mutually different MFD1S(N) (N is an integer of 1 or more; 1 through 4 in the present embodiment) as mode field diameters when transmitting the optical signal S through them. The cores 50a to 50d are arranged such that the core pitch P1 which is the distance between the centers thereof is uniform.

The collimating lens 52 is arranged to face the outputting surface 50h of the optical fiber 50A, and condenses the light output from the optical fiber 50A toward the WDM filter 40. The collimating lens 52 has a focal distance f1S when transmitting the optical signal S. On the outputting side of the optical signals S after amplification, the collimating lens 54 is arranged to face the incident surface 50i of the optical fiber 10B, and collimates the optical signals S amplified by the optical fiber 60 and condensed at the filter 42 toward the optical fiber 50B.

In the optical fiber 60, a rare earth element is doped to the cores 60a to 60d, and when the optical signals S from the optical fiber 50A are transmitted through it, the optical fiber 60 amplifies the optical signals S by the excitation light P from the optical fiber 70. The optical fiber 60 has a central core 60a, outer cores 60b to 60d, and a cladding 61 surrounding the cores 60a to 60d. In the optical fiber 60, the cores 60a to 60d are prepared through a different design, and the cores 60a to 60d have mutually different MFD2S (N) (N is an integer of 1 or more; 1 through 4 in the present embodiment) as the mode field diameters when transmitting the optical signal S through them, and a common MFD2P (N) (N is an integer of 1 or more; 1 through 4 in the present embodiment) as the mode field diameter when transmitting the excitation light P through them. The cores 60a to 60d of the optical fiber 60 are arranged such that their arrangement is similar to the arrangement of the cores 50a to 50d of the optical fibers 50A and 50B, and the arrangement of the cores 70a to 70d of the optical fiber 70 described below. The cores 60a to 60d are arranged such that the core pitch P2, which is the inter-center distance thereof, is uniform.

The collimating lens 62 is arranged to face the incident surface 60h of the optical fiber 60, and collimates the optical signals S emitted from the optical fiber 50A and condensed at the WDM filter 40 toward the optical fiber 60. The collimating lens 64 is arranged to face the outputting surface 60i of the optical fiber 60, and condenses the light amplified by the optical fiber 60 and output from it toward the filter 42. The collimating lenses 62 and 64 have a focal distance f2S when transmitting the optical signal S, and a focal distance f2P when transmitting the excitation light P.

The optical fiber 70 is configured to transmit the excitation light P used for signal amplification at the optical fiber 60, and has a central core 70a, outer cores 70b to 70d, and a cladding 71 surrounding the cores 70a to 70d. In the optical fiber 70, the cores 70a to 70d are prepared by a different design, and the cores 70a to 70d have a common MFD3P(N) (N is an integer or one or more; 1 through 4 in the present embodiment)" as the mode field diameter when transmitting the excitation light P through them. The cores 70a to 70d are arranged such that the core pitch P3, which is the inter-center distance thereof, is uniform.

The collimating lens 72 is arranged to face the outputting surface 70h of the optical fiber 70, and condenses the excitation light P entering from the optical fiber 70 toward the WDM filter 40. The collimating lens 72 has a focal distance f3P when transmitting the excitation light P.

The WDM filter 40 is arranged on the optical path between the optical fiber 50A and the optical fiber 60, and causes the optical signals S emitted from the optical fiber 50A to enter the optical fiber 60 through transmission. Further, the WDM filter 40 is arranged on the optical path between the optical fiber 70 and the optical fiber 60, and causes the excitation light P emitted from the optical fiber 70 to enter the optical fiber 60 through reflection. The filter 42 is a gain equalizing filter which is arranged on the optical path between the optical fiber 60 and the optical fiber 50B, which transmits the optical signals S amplified at the optical fiber 60, and which returns the excitation light P used for the amplification of the optical fiber 60 through reflection.

In this way, even in the case where the core design of each fiber is different and where the mode field diameters of the cores are different, each of the cores of the optical fibers satisfies equations (1) through (4) and conditions (1) through (4) shown in the first embodiment, whereby it is possible to mitigate the optical connection loss at the portion where the fiber is connected to the amplifier. That is, in the optical fiber amplifier 1a according to the second embodiment, the optical fibers 50A and 50B transmitting the optical signals S and the optical fiber 60 amplifying the optical signals S are optically connected by the spatial optical system such as the collimating lenses 52 and 62 and the WDM filter 40, and, furthermore, the arrangement of the cores 50a to 50d of the optical fibers 50A and 50B and the arrangement of the cores 60a to 60d of the optical fiber 60 are similar to each other. And each of the MFD1S(N) of the cores 50a to 50d of the optical fibers 50A and 50B is a value within the range of ±25% of the MFD2S(N)×(P1/P2) of the corresponding cores 60a to 60d of the optical fiber 60, and is a value within the range of ±25% of the MFD2S(N)×(f1S/f2S) of the corresponding cores 60a to 60d of the optical fiber 60. In this structure, even when the optical fibers 50A and 50B through which the optical signals S are transmitted are MCFs, it is possible to suitably effect optical connection between the cores of the optical fibers 50A and 50B and the cores of the optical fiber 60, making it possible to mitigate the connection loss at the time of optical amplification between the fibers. That is, in an optical amplifier for MCFs, it is possible to enhance the optical connection efficiency even between the fibers differing in MFD (in particular, those differing in MFD between the fibers). Further, the optical fibers 50A and 50B and the optical fiber 60 are connected by the spatial optical system, so that it is possible to collectively connect a plurality of cores, achieving simplification in structure and operation.

As in the first embodiment, in the optical fiber amplifier 1a, the arrangement of the cores 70a to 70d of the optical fiber 70 and the arrangement of the cores 60a to 60d of the optical fiber 60 are similar to each other. And each of the MFD3P(N) of the cores 70a to 70d of the optical fiber 70 is a value within the range of ±25% of the MFD2P(N)×(P3/P2) of the corresponding cores 60a to 60d of the optical fiber 60 and is a value within the range of +25% of the MFD2P(N)×(f3P/f2P) of the corresponding cores 60a to 60d of the optical fiber 60. In this structure, even when the optical fiber 70 through which the excitation light P is transmitted is an MCF, it is possible to suitably effect optical connection between the cores of the optical fibers 60 and 70, making it possible to mitigate the connection loss at the time of optical amplification between the fibers. That is, in an optical amplifier for MCF, it is possible to enhance the optical connection efficiency even between the optical fibers 60 and 70 differing in MFD. Further, the optical fibers 60 and 70 are connected by the spatial optical system, so that it is possible to collectively connect a plurality of cores, making it possible to achieve simplification in structure and operation.

Third Embodiment

Figure 9:
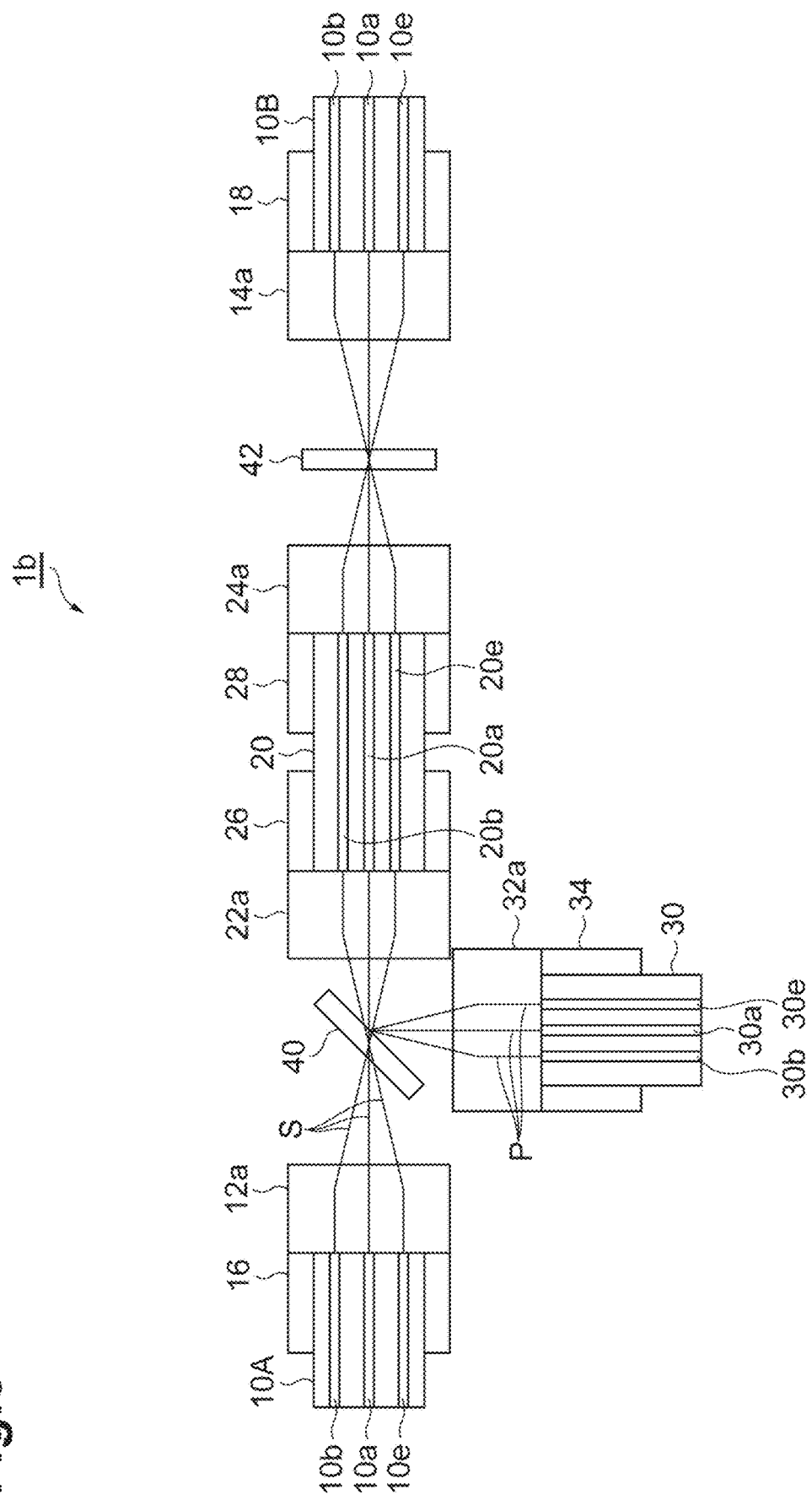
FIG. 9 is a diagram schematically illustrating the structure of an optical fiber amplifier according to a third embodiment.

Next, an optical fiber amplifier 1b according to the third embodiment will be described with reference to FIG. 9. FIG. 9 is a diagram schematically illustrating the structure of the optical fiber amplifier 1b according to the third embodiment. As shown in FIG. 9, substantially as in the first embodiment, the optical fiber amplifier 1b includes optical fibers 10A and 10B and GRIN lenses 12a and 14a for signal transmission, an optical fiber 20 and a pair of GRIN lenses 22a and 24a for signal amplification, an optical fiber 30 and a GRIN lens 32a for excitation light, a WDM filter 40, and a gain equalizing filter 42. Although the optical fiber amplifier 1b is substantially of the same structure as the optical fiber amplifier 1 according to the first embodiment, it differs from the first embodiment in that it is further equipped with ferrules 16, 18, 26, 28, and 34 retaining the fiber terminal of each optical fiber, and that the collimating lenses 12, 14, 22, 24, and 34 are GRIN lenses 12a, 14a, 22a, 24a, and 32a. The following description will center on the differences from the optical fiber amplifier 1, and a description of similar portions may be left out.

The ferrules 16 and 18 have a cylindrical configuration, and retain the respective fiber terminals of the optical fibers 10A and 10B. The GRIN lenses 12a and 14a, which are connected to the distal ends of the ferrules 16 and 18 have an outer diameter that is equal to the outer diameter of the ferrules 16 and 18. The ferrules 26 and 28 are members having a cylindrical configuration and retaining both fiber terminals of the optical fiber 20. The GRIN lenses 22a and 24a, which are connected to the distal ends of the ferrules 26 and 28, have an outer diameter that is the same as the outer diameter of the ferrules 26 and 28. The ferrule 34 is a member having a cylindrical configuration, and retaining the fiber terminal of the optical fiber 30. The GRIN lens 32a, which is connected to the distal end of the ferrule 34, has an outer diameter that is equal to the outer diameter of the ferrule 34. The optical function of the GRIN lenses 12a, 14a, 22a, 24a, and 32a is the same as that of the collimating lenses 12, 14, 22, 24, and 32 of the first embodiment.

As described above, as in the case of the first embodiment, in the optical fiber amplifier 1b according to the third embodiment, the optical fibers 10A and 10B transmitting the optical signals S and the optical fiber 20 amplifying the optical signals S are optically connected by the spatial optical system such as the GRIN lenses 12a and 22a, and, furthermore, the cores 10a to 10g of the optical fibers 10A and 10B and the cores 20a to 20g of the optical fiber 20 are similar to each other. Each of the MFD1S of the cores 10a to 10g of the optical fibers 10A and 10B is a value within the range of ±25% of (MFD2S×(P1/P2)) and is a value within the range of ±25% of (MFD2S(N)×(f1S/f2S)). In this structure, even when the optical fibers 10A and 10B transmitting the optical signals S are MCF, it is possible to mitigate the connection loss in the connection to amplification fibers or the like. The optical connection between the optical fiber 30 and the optical fiber 20 is the same as that in the first embodiment.

The optical fiber amplifier 1b has the ferrules 16, 18, 26, 28, and 34 retaining the fiber terminals of the optical fibers 10A, 10B, 20, and 30, and the outer diameter of the ferrules 16, 18, 26, 28, and 34 and the outer diameter of the GRIN lenses 12a, 14a, 22a, 24a, and 32a corresponding to the ferrules 16, 18, 26, 28, and 34 are equal to each other. In this structure, it is possible to perform alignment on the optical fibers 10A, 10B, 20, and 30, and the GRIN lenses 12a, 14a, 22a, 24a, and 32a through mechanical positioning based on outer diameter, thus facilitating the alignment operation.

In a modification of the optical fiber amplifier 1b, instead of the GRIN lenses 12a, 14a, 22a, 24a, and 32a connected to the fiber terminals of the optical fibers 10A, 10B, 20, and 30, GI fibers serving as GRIN lenses may be fusion-bonded to the distal ends of the optical fibers 10A, 10B, 20, and 30. In this case, the outer diameter of the optical fibers 10A, 10B, 20, and 30 and the outer diameter of the GI fiber lenses (the fusion-bonded GRIN lenses) corresponding to the optical fibers 10A, 10B, 20, and 30 may be equal to each other. In this structure, it is possible to easily perform alignment on each fiber and each lens. When the GI fiber lenses are polished as countermeasure against the reflection return light (RL), their performance as the lenses deteriorates, so that it is desirable that their surfaces should be left vertical. Further, in the optical fiber amplifier 1b, MCF are adopted, and the outer cores are offset from the axis center, so that it is possible to reduce the reflection return light without having to perform oblique polishing. In this case, however, it is desirable not to provide the central core, not to cause the optical signal to enter the central core, or to perform AR coating or the like on the central core.

Figure 10:
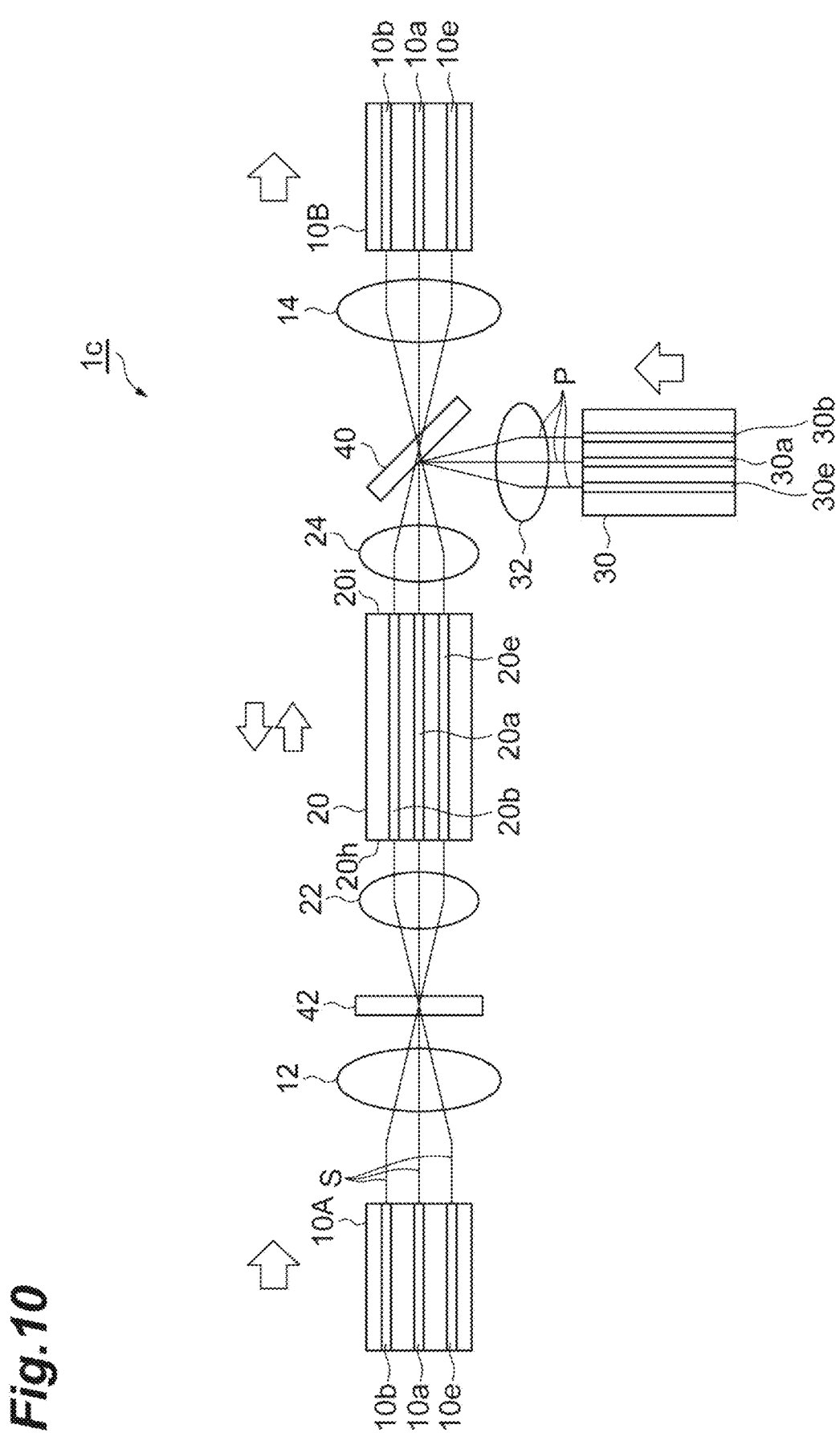
FIG. 10 is a schematic view of the structure of an optical fiber amplifier according to a modification.

The optical fiber amplifier according to the present embodiments has been described above, but the present invention is not limited to these embodiments and allows application of various modifications. For example, while the above-described embodiment is applied to the forward excitation type fiber amplifiers 1, 1a, and 1b, it is also applicable to a rearward excitation type fiber amplifier 1c as shown in FIG. 10. As shown in FIG. 10, in the rearward excitation type fiber amplifier 1c, on the optical signals S incident (end surface 20h) side of the optical fiber 20 for amplification, the optical fiber 10A is optically connected via the filter 42, which is a gain equalizing filter, and the optical fiber 30 for the excitation light is not optically connected to the optical fiber 20. On the other hand, on the optical signals S emission (end surface 20i) side of the optical fiber 20, the optical fiber 30 is optically connected to the optical fiber 20 via the WDM filter 40. The excitation light P enters from the end surface 20i of the optical fiber 20 via the WDM filter 40, and the optical signals S is amplified. Regarding the amplification method in the rearward excitation type fiber amplifier 1c, it is obvious to those skilled in the art, and a detailed description thereof will be left out. As in the case of the optical fiber amplifiers 1, 1a, and 1b, so long as the above equations (1)

through (4) and the above conditions (1) through (4) are satisfied, it is possible for the optical fiber amplifier 1c to reduce the connection loss accompanying MCF connection.

It should be understood that the embodiments disclosed herein are illustrative and non-restrictive in every respect. The scope of the present invention is shown, not in the above sense, but by the appended claims, and it is intended that all alterations in a sense and scope equivalent to those of the claims should be included.

What is claimed is:

1. An optical fiber amplifier comprising:
a first optical fiber having a plurality of first cores and a cladding surrounding the plurality of first cores, the first optical fiber being configured to transmit at least one optical signal;
a first lens arranged to face an outputting surface of the first optical fiber;
a second optical fiber having a plurality of second cores and a cladding surrounding the plurality of second cores, wherein a rare-earth element is doped to the second optical fiber, the second optical fiber being configured to amplify the optical signal propagating therein by excitation light;
a pair of second lenses respectively arranged to face entering and outputting surfaces of the second optical fiber;
a third optical fiber having one third core or a plurality of third cores and a cladding surrounding the one or the plurality of third cores, the third optical fiber being configured to transmit the excitation light used for the signal amplification in the second optical fiber;
a third lens arranged to face an outputting surface of the third optical fiber;
a first optical member arranged in an optical path between the first optical fiber and the second optical fiber, the first optical member being configured to cause the optical signal output from the first optical fiber to enter the second optical fiber through transmission or reflection; and
a second optical member arranged in an optical path between the third optical fiber and the second optical fiber, the second optical member being configured to cause the excitation light output from the third optical fiber to enter the second optical fiber through reflection or transmission,
wherein the first optical fiber, the first lens, the first optical member, one of the second lenses, and the second optical fiber are arranged such that the optical signal output from the first optical fiber enters the second optical fiber via the first lens, the first optical member, and the one of the second lenses, and
the third optical fiber, the third lens, the second optical member, the one or the other of the second lenses, and the second optical fiber are arranged such that the excitation light output from the third optical fiber enters the second optical fiber via the third lens, the second optical member, and the one or the other of the second lenses;
wherein the first cores of the first optical fiber and the second cores of the second optical fiber have homothetic arrangement each other at least in the arrangement of outer cores surrounding center of each fiber;
wherein the first cores of the first optical fiber each have a mode field diameter MFD1S when transmitting the optical signal and a core pitch P1, and the first lens has a focal distance f1S at the wavelength of the optical signal;
wherein the second cores of the second optical fiber each have a mode field diameter MFD2S when transmitting the optical signal and a core pitch P2, and the second lens has a focal distance f2S at the wavelength of the optical signal;
wherein the MFD1S of each first core of the first optical fiber is a value that is within ±25% of MFD2S×(P1/P2) of the corresponding second core of the second optical fiber; and the MFD1S of each first core of the first optical fiber is a value that is within ±25% of MFD2S× (f1S/f2S) of the corresponding second core of the second optical fiber.

2. The optical fiber amplifier according to claim 1,
wherein the third optical fiber has the plurality of third cores and a cladding surrounding the plurality of third cores, and the third cores of the third optical fiber and the second cores of the second optical fiber have homothetic arrangement each other at least in the arrangement of outer cores surrounding center of each fiber;
wherein the second cores of the second optical fiber each have a mode field diameter MFD2P when transmitting the excitation light, and the second lenses have a focal distance f2P when transmitting the excitation light;
wherein the third cores of the third optical fiber each have a mode field diameter MFD3P when transmitting the excitation light and a core pitch P3, and the third lens has a focal distance 3P when transmitting the excitation light; and
wherein the MFD3P of each third core of the third optical fiber is a value that is within ±25% of MFD2P×(P3/P2) of the corresponding second core of the second optical fiber, and the MFD3P of each third core of the third optical fiber is a value that is within ±25% of MFD2P× (f3P/f2P) of the corresponding second core of the second optical fiber.

3. The optical fiber amplifier according to claim 1,
wherein one of the plurality of second cores of the second optical fiber is a central core arranged on a center axis of the second optical fiber, and the one third core or one of the plurality of third cores of the third optical fiber is a central core arranged on the center axis of the third optical fiber; and
wherein the second optical fiber is configured such that the excitation light emitted from the central core of the third optical fiber and entering the central core of the second optical fiber is mode-connected with the outer second cores of the second optical fiber to distribute the excitation light.

4. The optical fiber amplifier according to claim 1,
wherein one of the plurality of second cores of the second optical fiber is a central core arranged on the center axis of the second optical fiber, and the third optical fiber is a single core fiber having the one third core arranged on a center axis of the third optical fiber and the cladding surrounding the one third core; and
wherein the second optical fiber is configured such that the excitation light emitted from the third core of the third optical fiber and entering the central core of the second optical fiber is mode-connected with the outer second cores of the second optical fiber to distribute the excitation light.

5. The optical fiber amplifier according to claim 1, wherein the first optical fiber has no central core arranged on a center axis of the first optical fiber, or is configured not to pass the optical signal through the central core arranged on the center axis of the first optical fiber.

6. The optical fiber amplifier according to claim 1, further comprising:
a first ferrule having a cylindrical configuration and retaining a fiber end of the first optical fiber;
a second ferrule having a cylindrical configuration and retaining a fiber end of the second optical fiber; and
a third ferrule having a cylindrical configuration and retaining a fiber end of the third optical fiber,
wherein the first lens connected to a distal end of the first ferrule is a GRIN lens, the second lens connected to a distal end of the second ferrule is a GRIN lens, and the third lens connected to a distal end of the third ferrule is a GRIN lens; and
wherein an outer diameter of the first ferrule is equal to an outer diameter of the GRIN lens of the first lens, an outer diameter of the second ferrule is equal to an outer diameter of the GRIN lens of the second lens, and an outer diameter of the third ferrule is equal to an outer diameter of the GRIN lens of the third lens.

7. The optical fiber amplifier according to claim 1,
wherein the first lens is a GRIN lens fusion-bonded to a fiber end of the first optical fiber, the second lens is a GRIN lens fusion-bonded to a fiber end of the second optical fiber, and the third lens is a GRIN lens fusion-bonded to a fiber end of the third optical fiber; and
wherein an outer diameter of the first optical fiber is equal to an outer diameter of the GRIN lens of the first lens, an outer diameter of the second optical fiber is equal to an outer diameter of the GRIN lens of the second lens, and an outer diameter of the third optical fiber is equal to an outer diameter of the GRIN lens of the third lens.

8. The optical fiber amplifier according to claim 1,
wherein the first, second, and third optical fiber are configured not to pass the optical signal or the excitation light through each central core arranged on the center axis of each optical fiber, or are configured not to have the central cores.

9. The optical fiber amplifier according to claim 1, wherein all of the first, second and third cores are arranged within a diameter of 0.1 mm around the center axis of each optical fiber.

10. The optical fiber amplifier according to claim 1, wherein the outer second cores of the second optical fiber are arranged to be closer to the center axis than the outer first cores of the first optical fiber.

11. The optical fiber amplifier according to claim 1, wherein the first and second optical members are formed by one wavelength division multiplexing filter.

12. The optical fiber amplifier according to claim 1, wherein the second optical member is formed by one wavelength division multiplexing filter.

13. An optical fiber amplifier comprising:
a first optical fiber having a plurality of first cores and a cladding surrounding the plurality of first cores, the first optical fiber being configured to transmit at least one optical signal;
a first lens arranged to face an outputting surface of the first optical fiber;
a second optical fiber having a plurality of second cores and a cladding surrounding the plurality of second cores, wherein a rare-earth element is doped to the second optical fiber, the second optical fiber being configured to amplify the optical signal propagating therein by excitation light;
a second lenses arranged to face an entering surface of the second optical fiber;
a third optical fiber having one third core or a plurality of third cores and a cladding surrounding the one or the plurality of third cores, the third optical fiber being configured to transmit the excitation light used for the signal amplification in the second optical fiber;
a third lens arranged to face an outputting surface of the third optical fiber;
a first optical member arranged in an optical path between the first optical fiber and the second optical fiber, the first optical member being configured to cause the optical signal output from the first optical fiber to enter the second optical fiber through transmission or reflection; and
a second optical member arranged in an optical path between the third optical fiber and the second optical fiber, the second optical member being configured to cause the excitation light output from the third optical fiber to enter the second optical fiber through reflection or transmission,
wherein the first optical fiber, the first lens, the first optical member, the second lens, and the second optical fiber are arranged such that the optical signal output from the first optical fiber enters the second optical fiber via the first lens, the first optical member, and the second lens, and
the third optical fiber, the third lens, the second optical member, the second lens, and the second optical fiber are arranged such that the excitation light output from the third optical fiber enters the second optical fiber via the third lens, the second optical member, and the second lens;
wherein the first cores of the first optical fiber and the second cores of the second optical fiber have homothetic arrangement each other at least in the arrangement of outer cores surrounding center of each fiber;
wherein the first cores of the first optical fiber each have a mode field diameter MFD1S when transmitting the optical signal and a core pitch P1, and the first lens has a focal distance f1S at the wavelength of the optical signal;
wherein the second cores of the second optical fiber each have a mode field diameter MFD2S when transmitting the optical signal and a core pitch P2, and the second lens has a focal distance f2S at the wavelength of the optical signal;
wherein the MFD1S of each first core of the first optical fiber is a value that is within ±25% of MFD2S×(P1/P2) of the corresponding second core of the second optical fiber; and the MFD1S of each first core of the first optical fiber is a value that is within ±25% of MFD2S×(f1S/f2S) of the corresponding second core of the second optical fiber.

14. An optical fiber amplifier comprising:
a first optical fiber having a plurality of first cores and a cladding surrounding the plurality of first cores, the first optical fiber being configured to transmit at least one optical signal;
a first lens arranged to face an outputting surface of the first optical fiber;
a second optical fiber having a plurality of second cores and a cladding surrounding the plurality of second cores, wherein a rare-earth element is doped to the second optical fiber, the second optical fiber being configured to amplify the optical signal propagating therein by excitation light;

a pair of second lenses respectively arranged to face entering and outputting surfaces of the second optical fiber;

a third optical fiber having one third core or a plurality of third cores and a cladding surrounding the one or the plurality of third cores, the third optical fiber being configured to transmit the excitation light used for the signal amplification in the second optical fiber;

a third lens arranged to face an outputting surface of the third optical fiber;

a first optical member arranged in an optical path between the first optical fiber and the second optical fiber, the first optical member being configured to cause the optical signal output from the first optical fiber to enter the second optical fiber through transmission or reflection; and a second optical member arranged in an optical path between the third optical fiber and the second optical fiber, the second optical member being configured to cause the excitation light output from the third optical fiber to enter the second optical fiber through reflection or transmission, wherein the first optical fiber, the first lens, the first optical member, one of the second lenses, and the second optical fiber are arranged such that the optical signal output from the first optical fiber enters the second optical fiber via the first lens, the first optical member, and the one of the second lenses, and the third optical fiber, the third lens, the second optical member, the other of the second lenses, and the second optical fiber are arranged such that the excitation light output from the third optical fiber enters the second optical fiber via the third lens, the second optical member, and the other of the second lenses;

wherein the first cores of the first optical fiber and the second cores of the second optical fiber have homothetic arrangement each other at least in the arrangement of outer cores surrounding center of each fiber;

wherein the first cores of the first optical fiber each have a mode field diameter MFD1S when transmitting the optical signal and a core pitch P1, and the first lens has a focal distance f1s at the wavelength of the optical signal;

wherein the second cores of the second optical fiber each have a mode field diameter MFD2S when transmitting the optical signal and a core pitch P2, and the second lens has a focal distance f2S at the wavelength of the optical signal;

wherein the MFD1S of each first core of the first optical fiber is a value that is within ±25% of MFD2S×(P1/P2) of the corresponding second core of the second optical fiber; and the MFD1S of each first core of the first optical fiber is a value that is within ±25% of MFD2S×(f1S/f2S) of the corresponding second core of the second optical fiber.

* * * * *